United States Patent
Wolf et al.

(10) Patent No.: US 10,227,994 B2
(45) Date of Patent: Mar. 12, 2019

(54) BLOWER DEVICE

(71) Applicant: Mahle International GmbH, Stuttgart (DE)

(72) Inventors: Walter Wolf, Oppenweiler-Zell (DE); Christof Bacher, Ditzingen-Heimerdingen (DE)

(73) Assignee: Mahle International GmbH (DE)

( * ) Notice: Subject to any disclaimer, the term of this patent is extended or adjusted under 35 U.S.C. 154(b) by 237 days.

(21) Appl. No.: 15/093,490

(22) Filed: Apr. 7, 2016

(65) Prior Publication Data

US 2016/0298655 A1 Oct. 13, 2016

(30) Foreign Application Priority Data

Apr. 8, 2015 (DE) .................. 10 2015 206 273

(51) Int. Cl.
*F04D 29/60* (2006.01)
*F04D 29/52* (2006.01)
*F04D 25/06* (2006.01)
*H02K 5/24* (2006.01)
*F04D 29/66* (2006.01)
*F04D 29/02* (2006.01)
*F04D 29/62* (2006.01)

(52) U.S. Cl.
CPC .......... *F04D 29/668* (2013.01); *F04D 25/06* (2013.01); *F04D 29/023* (2013.01); *F04D 29/626* (2013.01); *H02K 5/24* (2013.01)

(58) Field of Classification Search
CPC ....... F04D 29/626; F04D 29/668; H02K 5/24; H02K 5/00

USPC ............. 310/91; 267/158–160; 248/603–604
See application file for complete search history.

(56) References Cited

U.S. PATENT DOCUMENTS 2,936,140 A * 5/1960 Copeland ................ F16F 15/06
248/604
2,936,141 A * 5/1960 Rapata .................... F16C 27/02
248/604

(Continued)

FOREIGN PATENT DOCUMENTS

DE 1960197 A1 12/1971
DE 10328355 A1 1/2004

(Continued)

OTHER PUBLICATIONS

English abstract for DE-102005044665.

(Continued)

*Primary Examiner* — Burton S Mullins
(74) *Attorney, Agent, or Firm* — Fishman Stewart PLLC

(57) ABSTRACT

A blower device may include a housing and a motor mounted in the housing via a motor holder. The motor holder may be held on the housing via a plurality of arms such that a movement of the motor relative to the housing is permitted and a transmission of vibrations of the motor to the housing is dampened. The motor holder, at least one arm of the plurality of arms and the housing may be configured as a unipartite plastics injection-moulded part. Each arm of the plurality of arms may have a plurality of sections. The plurality of sections may include a first section connected to the motor holder, a second section angled relative to the first section, and a third section angled relative to the second section and connected to the housing.

19 Claims, 4 Drawing Sheets

(56) References Cited

U.S. PATENT DOCUMENTS

| | | | | |
|---|---|---|---|---|
| 3,065,941 | A * | 11/1962 | Loftis | F16F 15/06 248/604 |
| 3,145,910 | A * | 8/1964 | Jolly | F04D 29/626 248/604 |
| 3,317,166 | A * | 5/1967 | Janssen | F16F 15/02 248/604 |
| 3,666,219 | A | 5/1972 | Baus | |
| 3,775,029 | A * | 11/1973 | Ranz | F04D 25/06 392/360 |
| 3,790,114 | A * | 2/1974 | Italiano | F04D 29/646 248/672 |
| 4,161,667 | A * | 7/1979 | Buckman | H02K 5/24 248/603 |
| 4,200,257 | A * | 4/1980 | Litch, III | F04D 29/282 248/604 |
| 4,452,417 | A * | 6/1984 | Krafthefer | F16F 1/3732 248/604 |
| 4,616,355 | A * | 10/1986 | Kasahara | G11B 7/0932 369/44.12 |
| 5,582,507 | A * | 12/1996 | Alizadeh | F04D 19/002 248/604 |
| 5,878,990 | A * | 3/1999 | Delire | F04D 25/082 248/604 |
| 5,986,379 | A * | 11/1999 | Hollenbeck | H02K 1/145 310/216.038 |
| 6,198,193 | B1 * | 3/2001 | Kappauf | H02K 3/505 29/596 |
| 6,505,807 | B1 * | 1/2003 | Nolting | B60H 1/00521 248/638 |
| 6,897,580 | B2 * | 5/2005 | White | F04D 29/668 310/51 |
| 7,290,992 | B2 * | 11/2007 | Palluat de Besset | F02M 37/103 417/360 |
| 7,510,164 | B2 * | 3/2009 | Geroux | B60H 1/00428 248/560 |
| 7,568,602 | B2 * | 8/2009 | Turk | B25C 1/08 227/10 |
| 7,582,345 | B2 * | 9/2009 | Priegelmeir | B32B 1/04 428/60 |
| 8,208,031 | B2 * | 6/2012 | Makimoto | G02B 27/646 348/208.7 |
| 8,292,575 | B2 * | 10/2012 | Kim | F04D 29/668 415/204 |
| 8,596,596 | B2 * | 12/2013 | Naji | F04D 25/08 248/224.7 |
| 2008/0042039 | A1 | 2/2008 | Krempel et al. | |

FOREIGN PATENT DOCUMENTS

| | | | |
|---|---|---|---|
| DE | 202005011514 U1 | 10/2005 | |
| DE | 102005044665 A1 | 3/2007 | |
| DE | 102006035583 A1 | 2/2008 | |
| EP | 0728937 A1 | 8/1996 | |
| EP | 1431566 A1 * | 6/2004 | F02M 37/10 |
| EP | 1844965 A1 | 10/2007 | |

OTHER PUBLICATIONS

English abstract for DE-202005011514.
German Search Report dated Jan. 25, 2017 corresponding to related German Patent Application No. DE 10 2016 204 881.3.

* cited by examiner

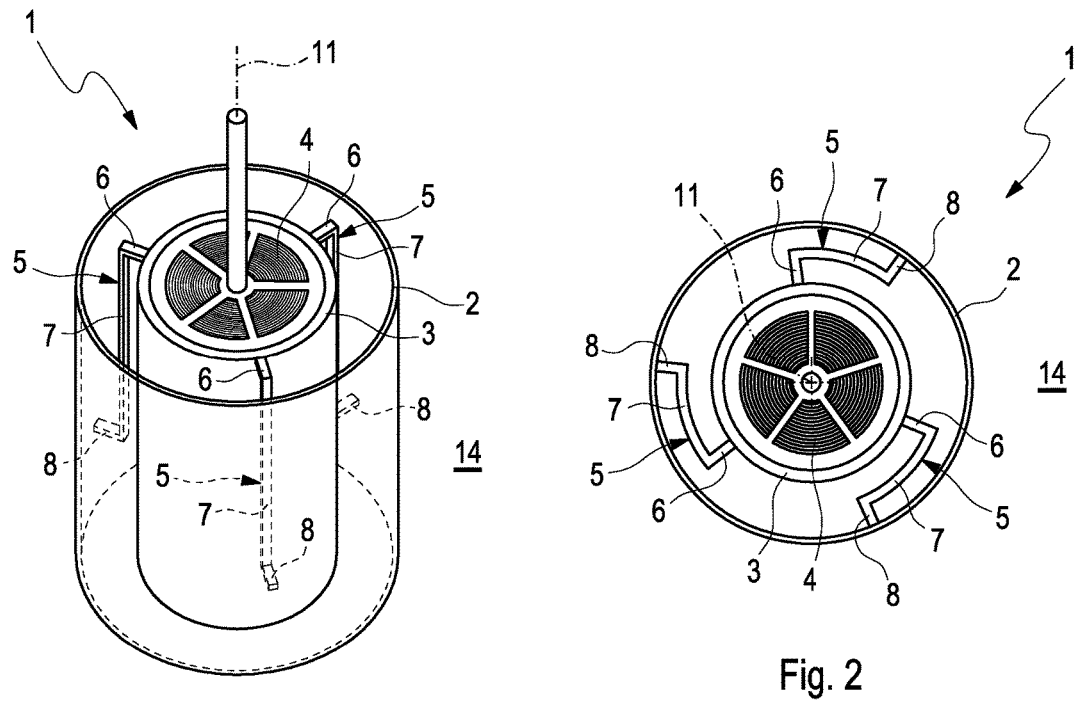
Fig. 1
Fig. 2
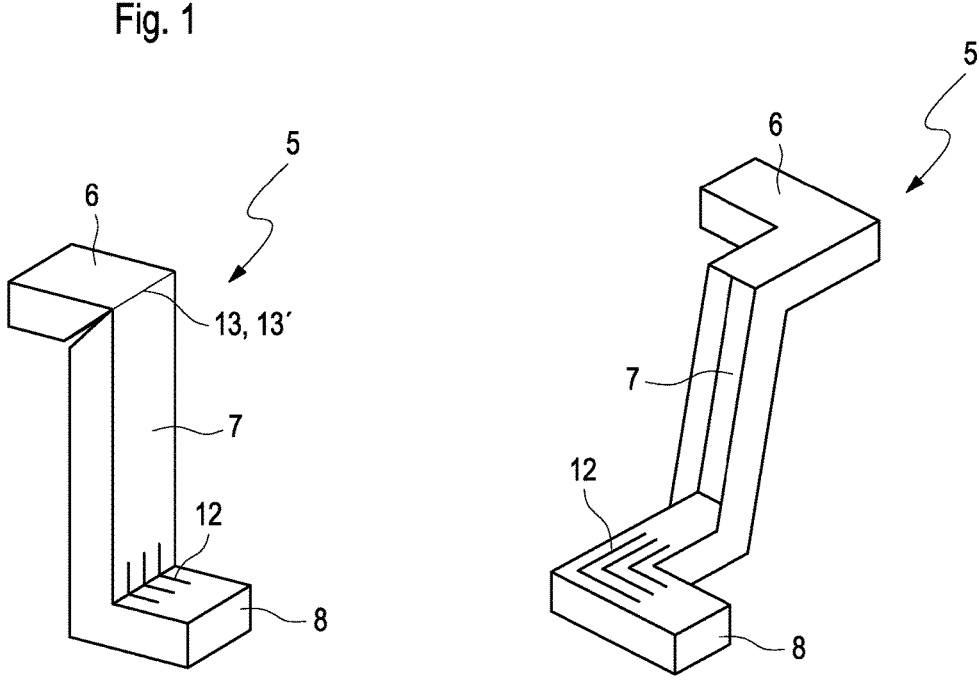
Fig. 3
Fig. 4

BLOWER DEVICE

CROSS-REFERENCE TO RELATED APPLICATIONS

This application claims priority to German Patent Application No. 10 2015 206 273.2, filed Apr. 8, 2015, the contents of which are hereby incorporated by reference in its entirety.

TECHNICAL FIELD

The present invention relates to a blower device having a housing and having a motor mounted in said housing by way of a motor holder. The invention also relates to a heating, ventilation or air-conditioning system, in particular in a motor vehicle, having at least one such blower device.

BACKGROUND

EP 1 844 965 B1 has disclosed a generic blower device having a housing and having a motor mounted in said housing by way of a motor holder, wherein the motor holder is held on the housing by way of arms such that a movement of the motor relative to the housing is permitted, but at the same time a transmission of vibrations of the motor to the housing is dampened. Here, the arms are formed in the manner of fastening beams and are mechanically connected to, that is to say mounted on, the housing.

Disadvantages of the blower device known from the prior art are however the relatively cumbersome manufacture thereof and the associated high production costs.

SUMMARY

The present invention is therefore concerned with the problem of specifying, for a blower device of the generic type, an improved or at least alternative embodiment which overcomes the disadvantages from the prior art.

Said problem is solved according to the invention by way of the subject matter of independent claim(s). The dependent claims relate to advantageous embodiments.

The invention is based on the general concept, in the case of a blower device having a housing and having a motor mounted in said housing by way of a motor holder, of forming the motor holder, the housing and the arms which fix the motor holder to the housing as a unipartite plastics injection-moulded part, and thus making it possible for these to be produced in a relatively straightforward manner but nevertheless with high precision. To permit a movement of the motor relative to the housing and at the same time dampen a transmission of vibrations of the motor to the housing, it is provided according to the invention that each arm has a first section, which is connected to the motor holder, a second section, which is angled relative to the first section, and a third section, which is angled relative to the second section and which is connected to the housing. The three sections of each arm are in this case arranged such that the plastics injection-moulded part which has the motor holder, the arms and the housing can be produced using a relatively simple plastics injection-moulding tool, which requires either only a single slide or even no slide at all.

In the case of fixed motor holders, that is to say without decoupling, undesirably intense transmission of the 12th/24th-order amplitudes (orders are multiples of the motor rotational speed) and mild transmission of the imbalance vibrations (1st-order) are often encountered. Contrarily, the 12th/24th-order amplitudes are normally dampened by way of decoupling measures, whereas the transmission of the imbalance vibrations is more intense than in the case of a fixed motor holder. Here, tests have shown that the stiffnesses in the three spatial directions are coupled owing to the construction and therefore cannot be separately varied or adjusted into the correspondingly desired resonance ranges. Since presumably all resonance points (axial, tangential and radial) and not only radial resonance points are excited by the imbalance force (action in a radial direction), the resonance points must be configured so as to lie above the operating range by a sufficient margin.

For this reason, the present invention pursues the path of realizing decoupling not by way of inserted elastomer elements but by way of integrally moulded "bending beams" (arms) which exhibit different stiffnesses in the three axis directions: axial, tangential and radial. Said arms are preferably configured so as to exhibit a high stiffness in a radial direction, in order that the imbalance (1st-order) remains in the sub-critical range of the resonance frequency (aim: natural resonance>150 Hz). In the tangential and axial directions, the stiffness should be as low as possible (natural resonance<100 Hz) in order for 12th-order excitations to be dampened with the greatest possible intensity, that is to say operated in the supercritical range. In this way, it is possible not only for the blower motor to be mounted optimally with regard to the transmission of vibrations, but at the same time for the motor holder, the housing and the arms which fix the motor holder to the housing to be formed as a unipartite plastics injection-moulded part, and thus in an inexpensive manner.

Here, it is even conceivable for said plastics injection-moulded part to be formed as a unipartite plastics injection-moulded part, wherein it is self-evidently alternatively also conceivable for use to be made of a two-component or three-component injection-moulding process, which makes it possible for individual constituent parts, for example the arms, to be produced from a plastic which differs from that of the housing and/or that of the motor holder. With the blower device according to the invention, it is thus possible for the holder of a motor to be produced in a straightforward manner in terms of manufacture and thus inexpensively, but at the same time with damping characteristics that can be influenced in virtually any desired manner, because in particular, it is possible for the shape and/or the orientation of the arms which hold the motor holder on the housing to be influenced by way of a correspondingly designed plastics injection-moulding tool.

In an advantageous refinement of the solution according to the invention, the arms have an S-shaped or a Z-shaped form. Such an S-shaped or Z-shaped form permits the angled arrangement of the individual three sections of each arm, wherein, for example, a first section may be arranged radially with respect to a motor axis, whereas a second section is arranged axially, tangentially or axially and with a curvature in a circumferential direction, and a third section, like the first section, runs radially. The S-shaped or Z-shaped form firstly permits reliable fixing of the motor to the housing but secondly greatly reduces a transmission of vibrations from the motor to the housing. Here, three, six or more such arms may be arranged on the outer circumference of the motor holder, depending on the holding forces and/or elasticities desired.

In a further advantageous embodiment of the solution according to the invention, the individual sections of the arms have different cross sections and/or different stiffnesses. It is for example conceivable for the second section to have a U-shaped cross section, whereas the first and the third section have rectangular cross sections. Here, a U-shaped cross section has a relatively high flexural stiffness, whereby it is possible, for example, for a degree of elastic twisting about the motor axis to be restricted. The cross sections are in this case merely selected such that it can be integrated into a plastics injection-moulding process, either as a separate part which is placed into the respective plastics injection-moulding tool or as a part which itself is produced during the plastics injection-moulding process. By way of the different cross sections of the individual sections of the arms and/or the different stiffnesses, it is thus possible for individual characteristics, such as support actions in the respective spatial direction or elasticities, to be influenced in a relatively straightforward manner.

The arms are expediently formed from a plastic which differs from that of the motor holder and/or from that of the housing. This makes it possible for the blower device to be produced as a two-component or multi-component part, in the case of which the arms themselves, or individual sections thereof, may be formed from a plastic which differs from that of the motor holder and/or from that of the housing. Here, it is self-evidently also conceivable for the arms composed of a different plastic to be inserted, as separate parts, into a corresponding plastics injection-moulding tool and for the motor holder or the housing to subsequently be injection-moulded onto said arms, or else for the arms to be injection-moulded at the same time as the motor holder and the housing but from a different plastic, and thus connected cohesively and/or in positively locking fashion and in unipartite fashion to the motor holder and to the housing.

In a further advantageous embodiment of the solution according to the invention, an articulated connection, in particular a film hinge, is arranged between: the first and the second section of an arm, the second and the third section of an arm, the first section and the motor holder, and/or the third section and the housing. By way of the articulated connection of two sections or of the arm to the motor holder or to the housing, it is in turn possible for the mounting of the motor in the housing to be influenced in a straightforward and individual manner, wherein such articulated connections are easy to produce during the injection-moulding process, in particular if they are in the form of film hinges.

In a further advantageous embodiment of the solution according to the invention, a reinforcement, in particular a strengthening means in the form of a metal insert or a fibrous insert, is provided in at least one section and/or one arm. In this way, it is possible for individual arms or individual regions and sections of the arms to be reinforced, wherein, as strengthening means, use may be made for example of reinforcement mats composed of endless or long fibres, steel fibres, aluminum fibres, composites or other similar fibres. Also, in this way, it is in turn possible for the stiffness of the motor mounting in certain spatial directions to be influenced, whereby the natural frequencies can be indirectly influenced.

It is expedient for the motor holder, the arms and the housing to be formed as a unipartite plastics injection-moulded part. This permits particularly inexpensive production which is optimized in terms of manufacture, because in particular, the mounting of the arms, for example on the housing, can be omitted entirely. Also, in the case of the stated components being formed as a unipartite plastics injection-moulded part, it is conceivable for strengthening means, for example the reinforcement fibres described in the section above, to be arranged in the arms, and to be encapsulated with plastic during the injection-moulding process. A two-component injection-moulding process is also conceivable here.

The present invention is also based on the general concept of using the above-described blower device in a heating, ventilation or air-conditioning system, for example in a motor vehicle. Owing to the blower device being formed as a plastics injection-moulded part, the latter has a low weight and is furthermore inexpensive to manufacture, which is highly advantageous in modern automobile construction.

Further important features and advantages of the invention will emerge from the subclaims, from the drawings and from the associated description of the figures on the basis of the drawings.

It is self-evident that the features above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description, wherein the same reference designations relate to identical or similar or functionally identical components.

BRIEF DESCRIPTION OF THE DRAWINGS

In the drawings, in each case schematically:

FIG. 1 is a schematic illustration of a blower device according to the invention, FIG. 2 is an illustration as in FIG. 1, but in a view from above and with different arms, FIGS. 3 and 4 show arms of different design.

DETAILED DESCRIPTION

Figure 5:
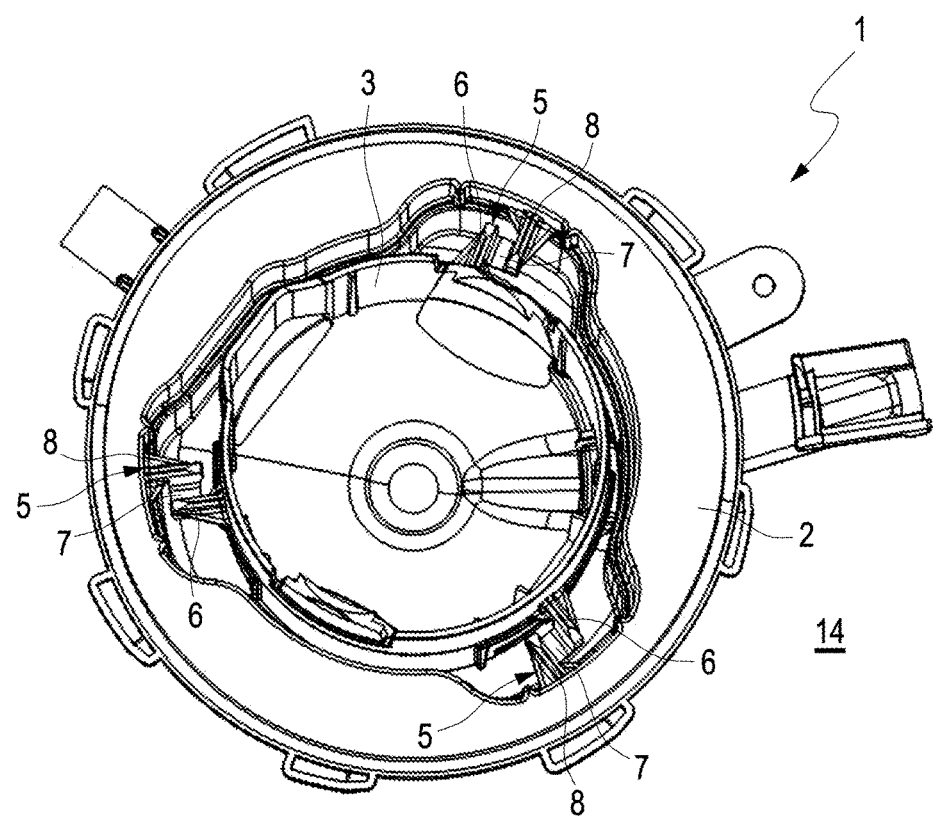
FIG. 5 shows a further possible embodiment of the blower device according to the invention in a view from above.
Figure 6:
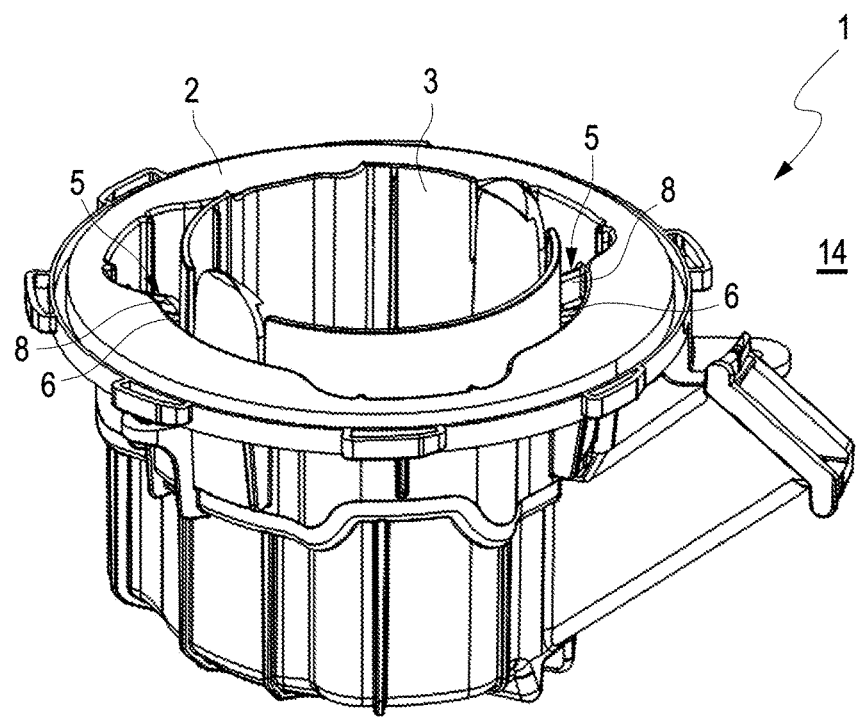
FIG. 6 is an illustration as in FIG. 5, but in a side view.
Figure 7:
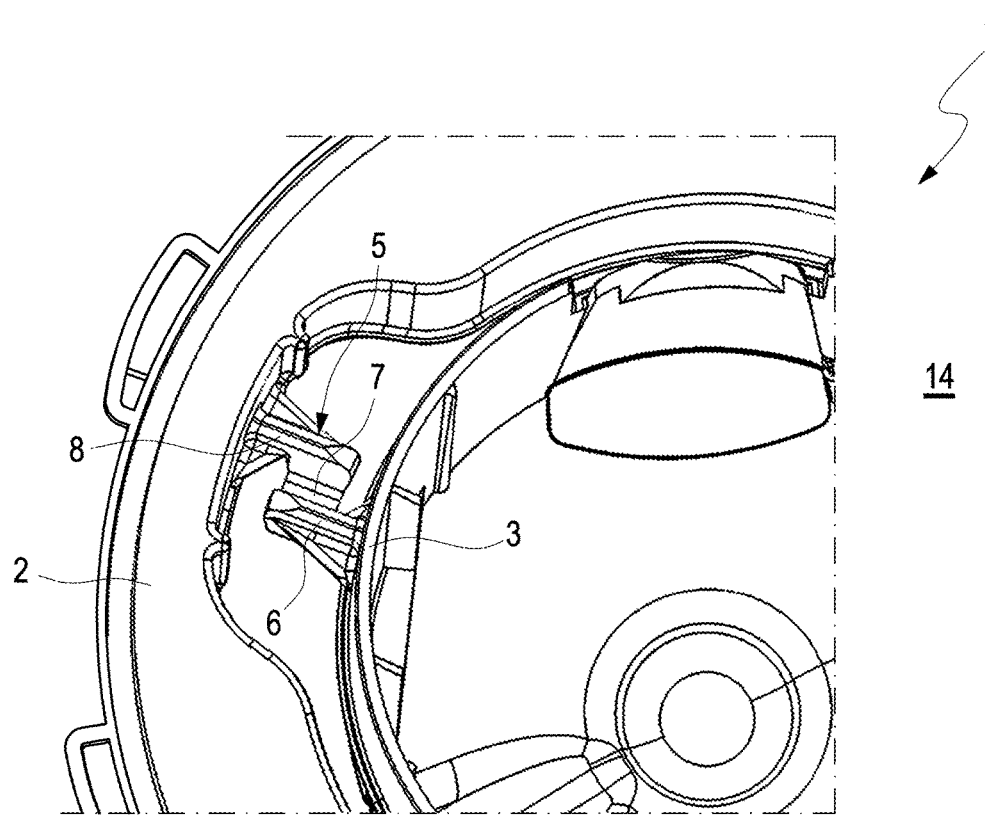
FIG. 7 is a detail illustration of a connection of a motor holder to a housing by way of an arm.
Figure 8:
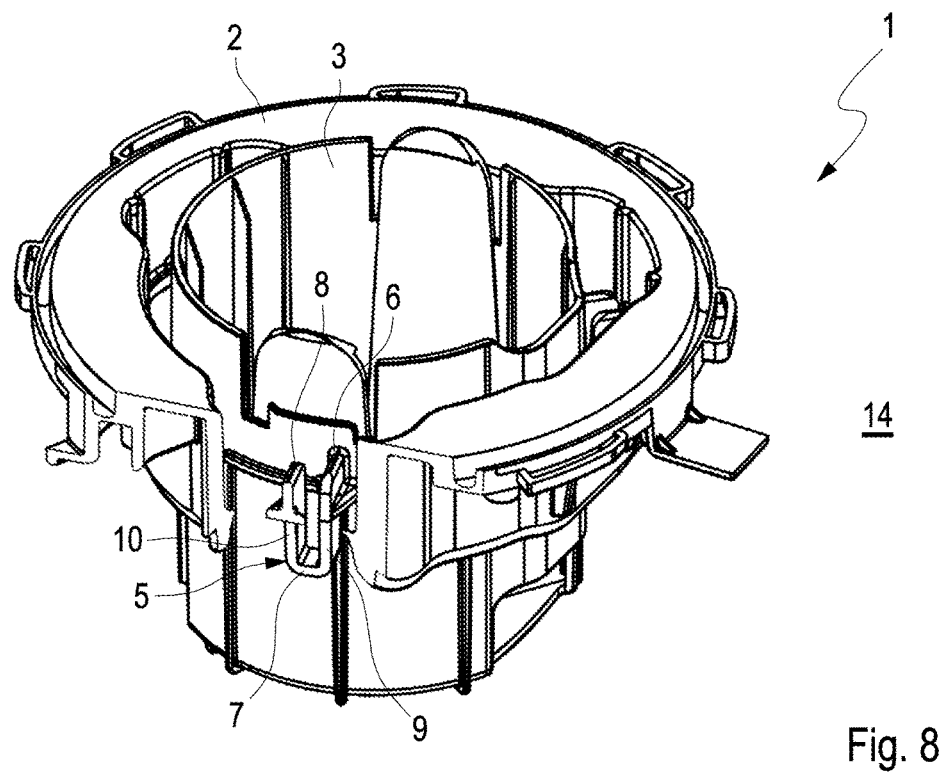
FIG. 8 shows a partially sectional view of a blower device according to the invention.

Correspondingly to FIGS. 1 and 2 and also 5 to 8, a blower device 1 according to the invention has a housing 2 and has a motor 4 (illustrated only in FIGS. 1 and 2), in particular an electric motor, mounted therein by way of a motor holder 3, wherein the motor holder 3 is held on the housing 2 by way of arms 5 such that a movement of the motor 4 relative to the housing 2 is permitted, but a transmission of vibrations of the motor 4 to the housing 2 is dampened and thereby reduced. A blower device 1 of said type may be used for example in a heating, ventilation or air-conditioning system 14, in particular in a motor vehicle. According to the invention, it is now the case that the motor holder 3, the arms 5 and the housing 2 are formed as a unipartite plastics injection-moulded part, whereby said motor holder can be produced not only inexpensively but also in a straightforward manner in terms of manufacturing. Furthermore, each arm 5 has a first section 6 (cf. also FIGS. 3 and 4), which is connected to the motor holder 3, a second section 7, which is angled relative to the first section 6, and a third section 8, which is angled relative to the second section 7 and which is connected to the housing 2. Here, with regard to their three sections 6, 7 and 8, the arms 5 are of S-shaped or Z-shaped form, wherein it is self-evidently conceivable for the second section 7 to be, for example, of U-shaped form (cf. FIGS. 5 to 8) and to be connected by way of its respective U limbs 9, 10 to the first section 6 and to the third section 7.

Figure 9A:
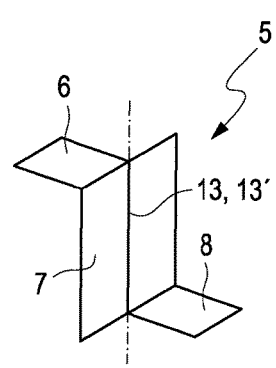
FIGS. 9A to 9I show different embodiments of an arm, in each case with a different number of articulated connections.
Figure 9B:
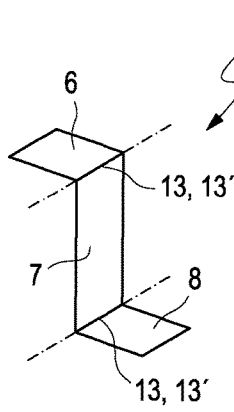
Figure 9C:
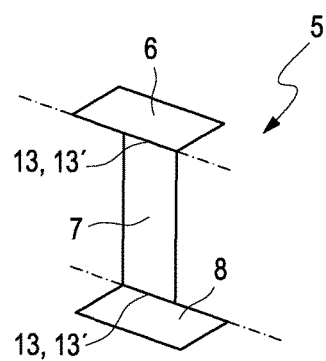
Figure 9D:
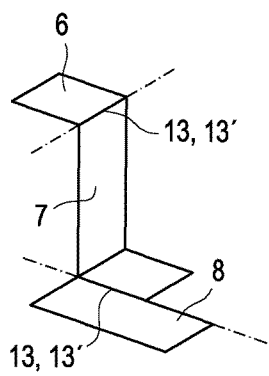
Figure 9E:
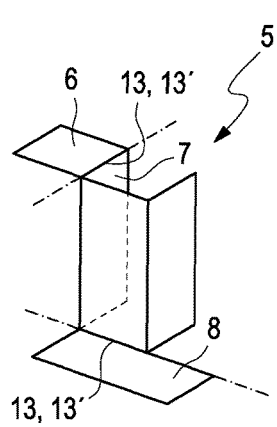
Figure 9F:
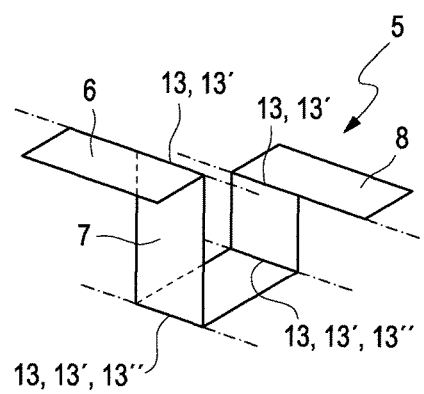
Figure 9G:
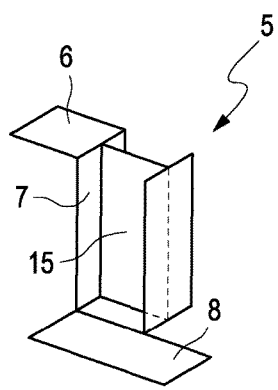
Figure 9H:
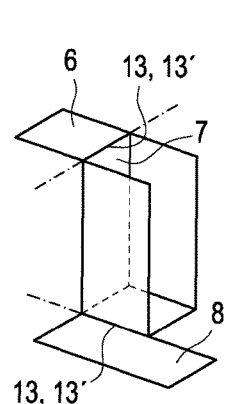
Figure 9I:
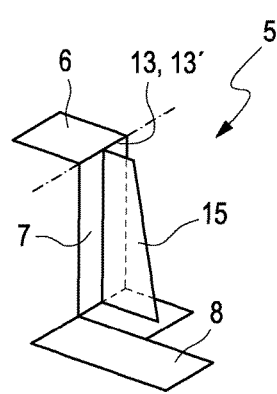

As per FIG. 9e and also g to i, it is also possible for at least one section 6, 7, 8 to be in the form of an angled profile, in particular a U-shaped profile (FIGS. 9e and h); a T-shaped profile (FIG. 9i) or H-shaped profile (FIG. 9g). Here, it is also possible for webs 15 for the stiffening of individual sections 6, 7, 8 to be provided, which either have a constant width or else narrow toward one section 6, 7, 8, as is illustrated in FIG. 9i.

With the arms 5 formed according to the invention, it is possible for the elastic mounting of the motor 4 in the housing 2 to be influenced, in particular by way of the shape and orientation of the arms 5 or the form of the individual section 6, 7 and 8 thereof.

Considering FIGS. 1 to 4, it can be seen that the individual sections 6, 7, 8 of the arms 5 extend, with respect to a motor axis 11 (cf. FIG. 1), as follows: here, the first section 6 extends radially with respect to the motor axis 11, in the same way as the third section 8. Considering the arms illustrated in FIGS. 1 and 3, it can be seen that the second section 7 extends axially, that is to say parallel to the motor axis 11, whereas in FIG. 2, said second section extends axially and with a curvature in a circumferential direction. Here, it is self-evident that all embodiments are conceivable which both permit straightforward plastics injection moulding of the blower device 1 and also satisfy the demanded bearing characteristics. For example, a relatively long second section 7 permits increased elasticity in the circumferential direction of the motor axis 11, because the length of the second section 7 also determines the stiffness thereof. Here, the longer the second section 7 is, the more flexible said second section is. In the same way, a U-shaped second section 7 may be of relatively flexible form, as is illustrated in FIGS. 5 to 8.

It is self-evidently possible for the bearing characteristics and in particular the elasticities of the individual sections 6 to 8 of the arms 5 to additionally be influenced by virtue of the individual sections 6, 7, 8 of the arms 5 having different cross sections and/or different stiffnesses. For example, it is conceivable for the second section 7 to be formed as a U-shaped profile (cf. for example FIGS. 4 and 8), whereby a second section 7 formed in this way exhibits a relatively high bending moment, and is thus relatively stiff.

To be able to further influence the stiffness of the individual sections 6, 7, 8 of the arms 5, provision may also be made for the arms 5 to be formed from a different plastic than the motor holder 3 and/or than the housing 2. The influencing of the stiffness is thus not restricted to geometrical shapes, but may also be realized by way of a certain predefined material selection. In order to make it possible for one of the sections 6, 7, 8 to be of particularly stiff form, provision may also be made for a reinforcement 12 (cf. FIGS. 3 and 4), in particular a form of strengthening means in the form of a metal or fibrous inlay, to be provided in said section and/or in the entire arm 5. Here, use may be made of steel fibres, aluminum fibres, glass fibres, aramide fibres, carbon fibres or the like.

It is also conceivable, for example, for the first section 6 to be connected by way of a film hinge 13', and thus in articulated fashion by way of an articulated connection 13, to the second section 7 (cf. FIG. 3 and FIG. 9), wherein such a connection may also be provided in the same way between the second and the third section 7, 8 or between the arm 5 and the housing 2 and the motor holder 3. In this way, too, it is possible for the stiffness to be individually influenced. If the articulated connection 13 is in the form of a film hinge 13', it is thus possible for the film hinge 13' to be formed by a fibrous insert, a fabric, a textile sheetlike structure or a metal or wire or cord reinforcement.

Considering the different embodiments of the arms 5 as per FIG. 9, a variety of possible arrangements of articulated connections 13 between the individual sections 6, 7, 8 can be seen. By way of the different orientation of the joint axes of the articulated connections 13 or of the film hinges 13', it is also possible to realize arms 5 with different stiffnesses in different directions. For example, in FIG. 9e), the second section 7 is in the form of an angled profile and is therefore of very flexurally stiff form. In the case of the arm 5 as per FIG. 9f), the section 7 even has two internal articulated connections 13", and is connected by way of two further articulated connections 13 to the first section 6 and to the third section 8.

In a particularly advantageous embodiment of the solution according to the invention, the motor holder 3, the arms 5 and the housing 2 are even in the form of a unipartite plastics injection-moulded part, and are thereby produced in one injection-moulding process. It is alternatively also conceivable, for example, for the arms 5 to be prefabricated separately and inserted as a finished insert part into the plastics injection-moulding tool, and for the motor holder 3 and the housing 2 to subsequently be injection-moulded thereon. In a further alternative, it is also conceivable for a different plastic to be used for the arms 5, or for individual sections 6, 7, 8 thereof, than for the housing 2 or the motor holder 3, such that a unipartite plastics injection-moulded part of said type is produced in a two-component injection-moulding process.

However, all of the embodiments here have in common the fact that the assembly composed of the motor holder 3, housing 2 and arms 5 is geometrically designed such that use can be made of an easily openable plastics injection-moulding tool, for example with only one slide. With the blower device 1 according to the invention, and in particular with the arms 5 designed according to the invention, it is possible for the stiffness in the axial direction, the radial direction and the tangential direction to be precisely coordinated, and thus both for the motor 4 to be optimally mounted and for optimum damping with regard to a transmission of vibrations from the motor 4 to the housing 2 to be achieved. Here, it is also pointed out that the arms 5 illustrated by way of example in FIGS. 3 and 4 constitute merely exemplary embodiments, such that further angled arms 5 or oblique arms 5 and/or arms 5 of circular or hollow cross sections may self-evidently also be encompassed by the invention.

The invention claimed is:

1. A blower device, comprising:
    a housing and a motor having a motor axis mounted in the housing via a motor holder;
    a plurality of arms structured and arranged to hold the motor holder on the housing such that a movement of the motor relative to the housing is permitted and a transmission of vibrations of the motor to the housing is dampened;
    the motor holder, at least one arm of the plurality of arms and the housing configured as a unipartite plastics injection-moulded part;
    wherein each arm of the plurality of arms has a plurality of sections including a first section connected to the motor holder, a second section angled relative to the first section, and a third section angled relative to the second section and connected to the housing, and wherein the second section has a longitudinal length extending axially to the motor axis between the first section and the second section, the longitudinal length of the second section being greater than that of the first section and the third section to facilitate increased elasticity in a circumferential direction of the motor axis; and a reinforcement disposed in at least one section of at least one arm of the plurality of arms, wherein the reinforcement includes at least one of a metal insert and a fibrous insert.

2. The blower device according to claim 1, wherein the plurality of arms have at least one of an S-shaped geometry and a Z-shaped geometry.

3. The blower device according to claim 1, wherein the first section of the plurality of arms extends radially to the motor axis between the motor holder and the second section, and the third section of the plurality of arms extends radially between the second section and the housing, and wherein the first section and the third section are arranged axially offset from one another with respect to the motor axis.

4. The blower device according to claim 1, wherein at least one section of the plurality of sections of at least one arm of the plurality of arms has at least one of a different cross section and a different stiffness from at least one other section of at least one of the plurality of arms.

5. The blower device according to claim 1, wherein the plurality of arms are composed of a plastic which differs from that of at least one of the motor holder and the housing.

6. The blower device according to claim 1, further comprising an articulated connection arranged between at least one of:
the first section and the second section of at least one arm of the plurality of arms,
the second section and the third section of at least one arm of the plurality of arms,
the first section of at least one arm of the plurality of arms and the motor holder, and
the third section of at least one arm of the plurality of arms and the housing.

7. The blower device according to claim 6, wherein the articulated connection is a film hinge structured and arranged to provide a pivoting movement about a joint axis of the articulated connection, and wherein the film hinge is composed of one or more of a fibrous insert, a fabric, a textile sheet-like structure, a metal reinforcement, a wire reinforcement and a cord reinforcement.

8. The blower device according to claim 1, wherein at least one section of the plurality of sections of at least one arm of the plurality of arms has an angular profile, and wherein the angular profile is a U-shaped profile, a T-shaped profile or an H-shaped profile.

9. The blower device according to claim 1, wherein the reinforcement is disposed in at least the third section of at least one arm of the plurality of arms.

10. The blower device according to claim 1, wherein at least one arm of the plurality of arms is configured separately and connected in at least one of a positively locking manner and cohesively to at least one of the motor holder and the housing via a two-component injection-moulding process.

11. The blower device according to Claim 1, wherein the at least one of the metal insert and the fibrous insert includes steel fibers, aluminum fibers, glass fibers, aramide fibers, or carbon fibers.

12. The blower device according to claim 1, wherein the second section extends parallel to the motor axis.

13. The blower device according to claim 1, wherein at least one arm of the plurality of arms includes a stiffening web disposed on the second section and extending axially along the longitudinal length of the second section.

14. A heating, ventilation or air-conditioning system, comprising: at least one blower device, the at least one blower device including:
a housing and a motor mounted in the housing via a motor holder;
at least one arm holding the motor holder on the housing such that a movement of the motor is permitted relative to the housing and a transmission of vibrations of the motor to the housing is dampened;
the at least one arm having a plurality of sections, the plurality of sections including a first section connected to the motor holder, a second section angled relative to the first section, and a third section angled relative to the second section and connected to the housing;
wherein the first section of the at least one arm has a rectangular cross section extending in a radial direction of a motor axis of the motor from the motor holder to the second section;
wherein the second section of the at least one arm has a U-shaped cross section including two limbs arranged spaced apart from one another and connected to the first section and the third section of the at least one arm, the second section extending in an axial direction of the motor axis, a tangential direction of the motor axis, or in the axial direction with a curvature in a circumferential direction of the motor axis; and
wherein the third section of the at least one arm has a rectangular cross section extending in the radial direction from the second section to the housing.

15. The heating, ventilation or air-conditioning system according to claim 14, wherein the motor holder, the at least one arm and the housing are configured as a unipartite plastics injection-molded part.

16. The heating, ventilation or air-conditioning system according to Claim 14, wherein the second section extends in the axial direction of the motor axis such that the two limbs are arranged axially extended and radially spaced apart from one another, and wherein the second section has a longitudinal length greater than that of the first section and the third section.

17. The heating, ventilation or air-conditioning system according to claim 14, wherein the at least one arm includes an articulated connection arranged at a first joint between the first section and the second section and at a second joint between the second section and the third section.

18. The heating, ventilation or air-conditioning system according to claim 17, wherein the articulated connection is a film hinge structured and arranged to provide a pivoting movement about a joint axis of the first joint and the second joint, and wherein the joint axis of the first joint is oriented differently than the joint axis of the second joint.

19. A blower device, comprising:
a housing and a motor having a motor axis mounted in the housing via a motor holder;
a plurality of arms holding the motor holder on the housing such that a movement of the motor is permitted relative to the housing and a transmission of vibrations of the motor to the housing is dampened;
the motor holder, the housing, and at least one of the plurality of arms configured as a unipartite plastics injection-moulded part;

the plurality of arms provided with a plurality of sections including a first section connected to the motor holder, a second section angled relative to the first section, and a third section angled relative to the second section and connected to the housing, wherein the second section extends along an axial direction of the motor axis between the first section and the third section such that the first section and the third section are arranged axially offset from one another with respect to the motor axis; and wherein at least one arm of the plurality of arms includes a film hinge defining an articulated connection at a first joint between the first section and the second section and at a second joint arrangement between the second section and the third section, and wherein the first joint has a joint axis oriented differently than that of the second joint.

\* \* \* \* \*